Nov. 14, 1933.  F. H. OSBORNE ET AL  1,935,371
ELECTRICAL APPARATUS
Filed July 12, 1930   2 Sheets-Sheet 2
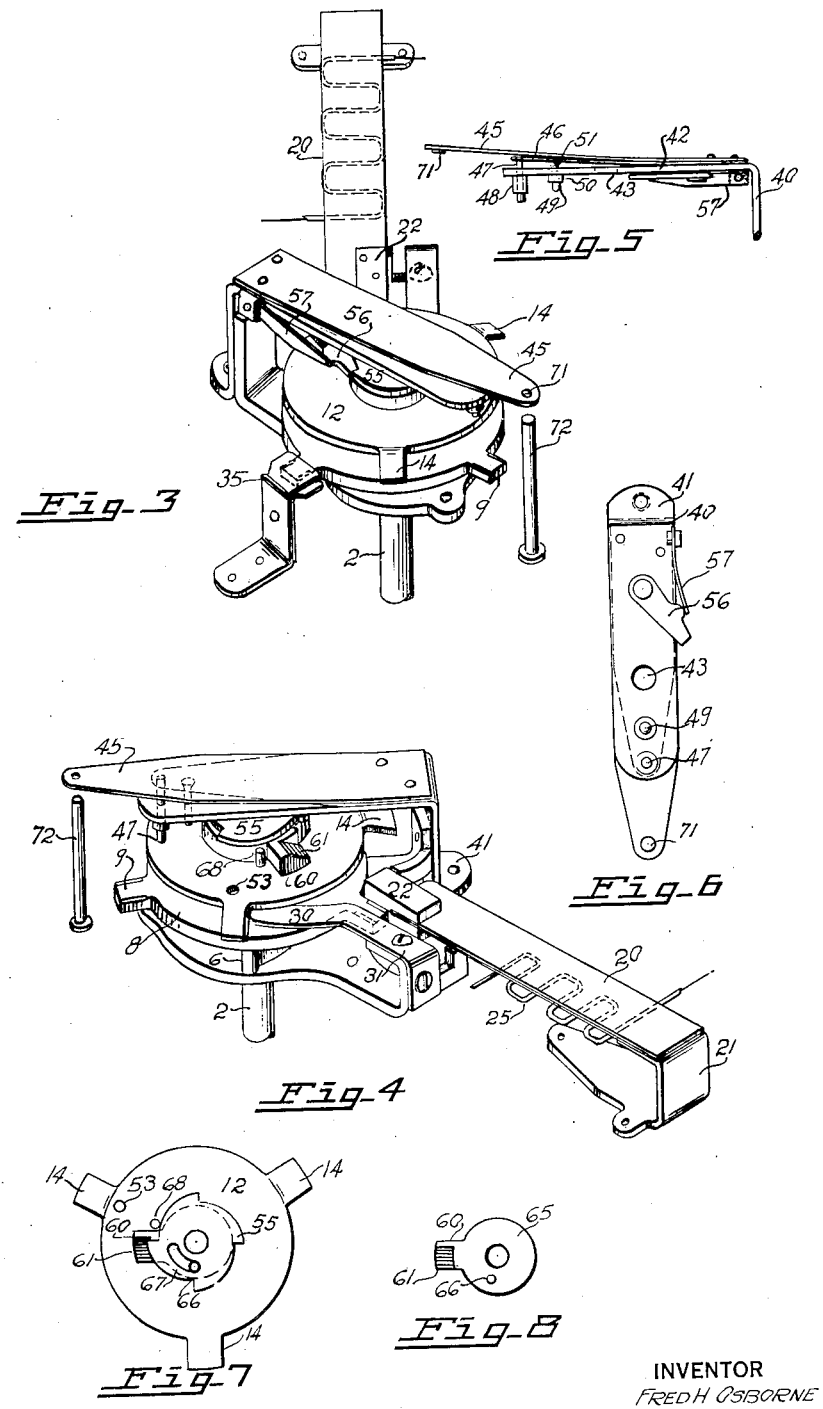
INVENTOR
FRED H. OSBORNE
HOWARD M. THRELKELD
BY
ATTORNEY Patented Nov. 14, 1933

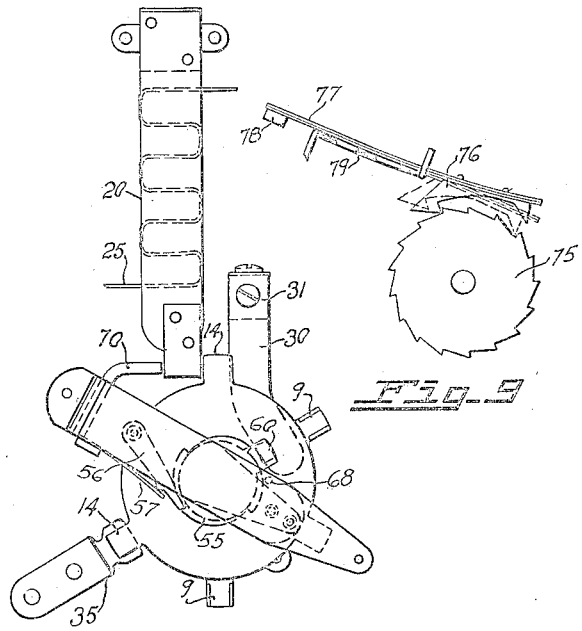
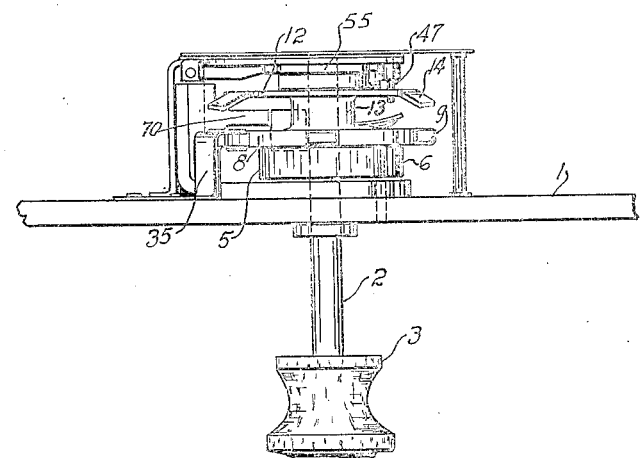

1,935,371

UNITED STATES PATENT OFFICE 1,935,371

ELECTRICAL APPARATUS

Fred H. Osborne and Howard M. Threlkeld, Chicago, Ill., assignors, by mesne assignments, to Grigsby-Grunow Company, a corporation of Illinois Application July 12, 1930. Serial No. 467,528

16 Claims. (Cl. 200—116)

This invention is concerned with electrical apparatus and particularly with an electrical switching device. In order to control electric circuits and electrically energized devices, such as motors and the like, it is essential that, not only should there be a means for opening and closing the circuit through such devices, under normal conditions, but also a means for protecting the circuit and associated apparatus when conditions in the circuit become abnormal. In particular it is a practical necessity that a simple, cheap and effective means be provided for protecting apparatus, such as motors, against dangerous overloads. While an ordinary fuse is effective in this respect, there are serious objections to the use of a fuse involving the inconvenience of replacing fuse elements, as well as cost of such elements.

Overload switches of the type having switch members retained in closed position by some catch and tripped to the open position by some thermal responsive means, are well known in this respect. Such devices permit an operator to maintain the switch continuously in the closed position under overload conditions when the switch would normally tend to open itself and thus permit dangerous conditions to exist An object of this invention is to devise a switch which will maintain a closed circuit under normal conditions and which will open the circuit under abnormal conditions, and keep such circuit open during the existence of such abnormal conditions.

A further object is to devise a switch of the above character which will tend, of its own accord, to close the circuit after conditions in the current consuming device have become stable. A switch involving this feature is valuable for the reason that many overload conditions are of a transitory nature and only require the passage of an interval of time for rectification.

An additional object of this invention is to devise a switch of the above character which will go through a predetermined series of operating cycles and then become finally locked in an open position. Such a feature is desirable in the event that conditions resulting in overload do not disappear but require servicing or adjustment of the device. Under such conditions it is clear that the operator tending such switch will have his attention called to the fact that conditions within the circuit must be changed before satisfactory operation will be assured. An additional object is to devise a switch and energy storing means whose tendency will be to progressively change the position of the switch, which tendency will be either promoted or hindered depending upon circuit conditions. An additional object is to devise a switch with energy storing actuating means tending to progressively change the position of the switch through a predetermined series of operating cycles and associate therewith means responsive to abnormal circuit conditions for controlling the position of said switch. An additional object is to associate visual or other warning means with the switch so that attention will be called to the position of the switch at the end of a series of operating cycles.

In general this invention comprises a switching means of any suitable type adapted to open and close an electric circuit. Associated with and controlling the position of said switching means is an energy storing means tending to progressively change the position of the switch. Such energy storing means may consist of a coiled spring and tend to make the switch go through a series of operating cycles during which energy is extracted from said storing means. In order to control said energy storing means, or the switch, means are associated therewith for retaining the switch in the closed position during normal circuit conditions and for permitting said switch to assume its open position during abnormal circuit conditions. In this particular instance such means are provided for protecting against overload, but it is obvious that protection may be obtained against failure of voltage. In order to leave the switch in a condition where the apparatus and circuit will be protected when the level of energy in the storing means is low, we preferably associate with the switch, means for locking the switch in an open position at the end of a series of operating cycles. Means are provided for introducing a new supply of energy into said storing means and in conjunction therewith there is provided means for releasing the lock and permitting said switch to close so that a new series of operating cycles may be initiated.

With overload responsive means it is preferable to so arrange and design such means that when the switch is open in response to a condition of overload it will remain open for a definite interval of time, during which the effects of the overload on the apparatus, such as the heating of the motor, may disappear before closure of the circuit. In this way the continuous maintenance of a closed circuit during abnormal conditions is rendered impossible.

In its more specific aspect the invention is described in connection with the accompanying drawings in which, Figure 1 is a top view looking down upon the switch, Figure 2 is a side view showing the switch in the locked position at the end of a series of operating cycles, Figures 3 and 4 are perspective views of the switch with the main circuit closed.

Figures 5 to 8 inclusive are details,

Figure 9 shows a modification.

Through a base 1 of suitable material a shaft 2, bearing a knob 3 at its free end, passes. Rigidly fastened to the shaft is an energy storing means here shown as a coiled spring 5. The free end of spring 5 is fastened at 6 to a rotatively mounted member 8. Member 8 is provided with a plurality of toothed projections 9 which may be of any desired configuration. Above toothed member 8 is a similar member 12 rigidly joined to 8 in any suitable manner, as by hub 13. Member 12 is provided with a plurality of projections 14 around the periphery thereof, of any desired shape. Preferably, however, projections or teeth 14 are similar to teeth 9, both as to shape and number with the provision that member 12 is rotatively staggered with respect to member 8. It is evident, therefore, that teeth 14 are located between teeth 9 and preferably midway.

Cooperating with two members 8 and 12 to form an escapement therewith, is a latch 20 supported by a U shaped member 21 and carrying at its free end a block 22. Latch 20 is preferably made of bimetal so that change of shape will occur with change of temperature. In the normal position of the latch, as shown in Figure 4, block 22 is disposed in the plane of member 8 and contacts with a tooth 9 thereof. It is clear that in this position any tendency of the coiled spring to rotate members 8 and 12 will be resisted.

Disposed in close proximity to bimetallic latch 20 is a heating element 25, here shown as of zig-zag shape. If heating element 25 is sufficiently energized, the temperature of bimetal member 20 will be raised, and cause said member to curve.

Bimetal member 20 is preferably so disposed that upon a rise in temperature block 22 will be raised upwardly from the plane of member 8 to the plane of member 12. When this occurs members 8 and 12 will be free to turn until one of the teeth 14 contacts with block 22 and stops further rotation.

Associated with this escapement mechanism, is an electric switching means which may be of any desired construction, but which is here shown as consisting of contact strip 30, supported at 31, contacting with member 8. A contact clip 35 is disposed so that contact is made only through teeth 9.

It is clear, therefore, that if any energy is stored in spring 5 there will be a tendency for the escapement mechanism to progressively change the switch from one position to another. As bimetal latch 20 is alternately heated and cooled, a circuit through suitable current consuming electrical apparatus is made and broken at clip 35 and teeth 9. Obviously by associating heating element 25 with said circuit, a suitable protective switch will result which will maintain the circuit closed during normal conditions and will open the circuit during abnormal conditions, such as overload. By suitable design of thermostatic strip 20, as well as its mounting, it is possible to make the cooling of the bimetal strip from its hot position so slow that the effects of overload on the apparatus to be protected will disappear.

In case the device has been operated several times, spring 5 may be sufficiently unwound so that it will no longer tend to rotate the toothed member. In such a case the switch would be useless as far as protection is concerned. In order to guard against this possibility we provide means for locking the toothed members after a series of operating cycles. This means consists of an L shaped member 40, shown in Figures 5 and 6, mounted at 41 so that the long straight portion 42 overlies member 12. Portion 42 may be provided with an aperture 43 into which the free end of shaft 2 projects. In this way member 40 may be centered and serve to keep the elements of the device in suitable position. Member 40 has riveted thereto, two spring members 45 and 46. Spring 46 carries at its free end a pin 47 slidably mounted in sleeve 48 at the end of member 40. An additional pin 49 is mounted in a sleeve 50 in member 40 and has a flattened head 51 preventing pin 49 from dropping through sleeve 50.

Toothed member 12 is provided with an aperture 53 located at such a distance from the center, that pin 47 may engage it during the course of rotation of member 12.

In the locked position, shown in Figure 2, the escapement mechanism is locked against further movement irrespective of the condition of the latch 20. The locked position is so chosen that the circuit is broken at clip 35. Obviously, however, aperture 53 may be so disposed that the switch will be closed in the locked position.

In the locked position the level of energy in the storing means, in this instance coil spring 5, is at a minimum. It is evident that if the purposes of the invention are to be subserved the means for raising the energy level in spring 5 should be related to the locking means so that the escapement is released for operation only when an additional supply of energy has been introduced. This is accomplished by providing a ratchet wheel 55 just below portion 42 of member 40. This ratchet cooperates with a pawl 56 pivotally mounted on member 40 and pressed inwardly by a spring 57 to engage ratchet 55. Rotatively mounted on shaft 2 between member 12 and ratchet 55 is a plate 65 provided with an upstanding pin 66. Ratchet wheel 55 is provided with an arcuate slot 67 in which pin 66 is adapted to ride. Extending outwardly from plate 65 is a block 60 having a sloping cam surface 61. Block 60 is disposed such a distance from the center of shaft 2 that it will contact with pin 49 in the course of its travel around shaft 2. It is evident that as long as pin 47 rides along the surface of toothed member 12, inner pin 49 will freely ride up cam surface 61 and permit block 60 to go by.

As clearly shown in Figure 7, the relative location of block 60 and aperture 53 of member 12 is such that in the extreme retarded position of block 60, aperture 53 is behind block 60. Hence, as member 12 is rotated, block 60 will pass under inner pin 49 just before aperture 53 of member 12 registers with outer pin 47.

As knob 3 is turned in a clockwise direction when looking at the front of the knob, ratchet wheel 55 is turned with shaft 2. Pawl 56 will catch on the teeth of ratchet 55 in various positions to prevent spring 5 from unwinding. As ratchet 55 turns, anti-clockwise looking at Figure 7, plate 65 and its cam block 60 will follow. When a complete turn of the knob has been made, cam block 60 will have been moved from in front of inner pin 49 to the rear thereof. As the knob is turned, block 60 will be forced against pin 49 and cause the pin to rise along cam surface 61. This rising of pin 49 will force springs 45 and 46 upwardly and pull outer pin 47 from slot 53. Assuming bimetal latch 20 to be in the cold position; namely, with block 22 in the plane of member 8, members 8 and 9 will be snapped by spring 5 until one of teeth 9 of member 8 strikes block 22. This will also bring a tooth 9 in contact with clip 35 thereby closing the circuit.

In order to prevent overwinding of spring 5, a pin 68 is disposed in plate 12 in the path of block 60. Hence, when member 12 carries pin 68 around with it for a complete revolution, knob 3 may only be turned one revolution when block 60 will be caught by pin 68.

To take up the shock of impact of teeth 9 and 14 against block 22, we provide a rest 70 at the rear of block 22.

In order that visual indication of the locked condition of the mechanism may be given, spring 45 bears at its end a contact member 71 and is adapted to cooperate with a fixed contact member 72. This forms an auxiliary switch which is closed when pin 47 falls into aperture 53 and permits spring 45 to press contact 71 against 72. Any suitable means such as lamps, buzzers, or the like, may be controlled by this circuit to call attention to the condition of the switch.

In Figure 9, a modified form of escapement, similar to the type used in watch movements is shown. Here a single toothed wheel 75 is provided with a pivotally mounted detent 76 having claws at each end adapted to engage with the teeth of wheel 75. A bimetal strip 77 fastened at 78 has its other end connected to detent 76 along one of the arms thereof. The heating element 79, where energized, causes strip 77 to curve from the full line position to the dotted line position. This movement of detent 76 permits wheel 75 to be rotated by a spring, not shown.

We claim:

1. A switching device comprising a switch adapted to open and close an electric circuit, means responsive to abnormal circuit conditions for controlling said switch, means for preventing the closure of the switch during abnormal circuit conditions, and means for locking the switch in open position after a predetermined series of operating cycles.

2. An electrical switching device comprising spring biased switching means for opening and closing a circuit and adapted to progressively change its position, overload responsive means for retaining said switching means in a closed position during normal circuit conditions, said overload means including means for opening and preventing the closure of said switching means during a period of abnormal circuit conditions.

3. An electrical switching device comprising spring biased switching means adapted to open and close a circuit and adapted to progressively change its condition in response to the spring bias, overload responsive means for maintaining said switching means in a closed position during normal circuit conditions and for maintaining said switching means in an open position during overload conditions and means for locking the switch in an open position after a predetermined series of operating cycles.

4. An electrical switching device comprising switching means adapted to open and close a circuit, energy storing means adapted to progressively change the condition of the switch through a series of operating cycles, means responsive to abnormal circuit conditions for retaining said switch in closed position and means for locking said switch in an open position at the end of the series of operating cycles whereby said switch will not be in a closed position when the level of energy in said storing means is at a minimum.

5. A switching device comprising a switch adapted to open and close an electric circuit, energy storing means for progressively changing the condition of said switch through a series of operating cycles, means responsive to abnormal circuit conditions for retaining said switch in closed and open positions during normal and abnormal circuit conditions respectively, means for locking said switch in an open position at the end of a series of operating cycles during which a substantial portion of the energy in said storing means has been released and means for introducing an additional supply of energy in said storing means and unlocking said switch from the open position.

6. An electrical switching device comprising a switch adapted to open and close an electric circuit, energy storing means adapted to progressively change the condition of said switch for a predetermined series of operating cycles, means for retaining said switch in closed position during normal circuit conditions and for retaining said switch in open position during abnormal circuit conditions, means for locking said switch in open position at the end of a series of operating cycles when the supply of energy in the storing means is at a minimum, and means for releasing said locking means after the energy level in said storing means has been raised above its minimum value.

7. A protective switching device comprising switch elements adapted to open and close a circuit through electrical apparatus, means tending to progressively change the condition of the switch through a series of operating cycles, overload responsive means for retaining said switch in a closed position during normal circuit conditions and for opening said switch under overload conditions and for retaining said switch in open position for a time interval within which the effects of the overload upon the electrical apparatus may disappear, and means for locking said switch in open position at the end of the series of operating cycles.

8. A protective switching device comprising switch elements adapted to close and open a circuit through electrical apparatus, means tending to progressively change the condition of the switch through a series of operating cycles, overload responsive means for retaining said switch in a closed position during normal conditions and for opening said switch under overload conditions, and retaining said switch in the open position for a time interval during which the effects of overload on electrical apparatus may disappear, and after which said switch is permitted to close, said overload responsive means being governed by circuit conditions only when the switch is in closed position.

9. An electrical switching device comprising switch elements adapted to open and close an electric circuit through electrical apparatus, means tending to progressively change the position of the switch through a series of operating cycles, thermal responsive means for maintaining said switch in closed position during normal conditions and for opening said switch during overload conditions, said means keeping said switch open for a predetermined time interval, within which the effects of the overload upon the apparatus may disappear, said means permitting said switch to close automatically after the expiration of said time interval.

10. A control device comprising a plurality of mechanical elements adapted to have their relative positions varied, an escapement mechanism tending to change the position of said elements, a thermostatic element for controlling said escapement, means for locking the escapement so that said elements occupy a predetermined position with respect to each other at the end of a series of operating cycles, means for storing energy for operating said escapement and means for raising the level of energy in said storage means while unlocking said escapement.

11. An electric protective device comprising a switch adapted to open and close an electric circuit through apparatus, means tending to progressively change the condition of said switch and means for controlling said first named means to maintain said switch in one position during normal circuit conditions and in another position during overload conditions, said last named means including thermostatic elements adapted to maintain the switch in overload position for a time interval within which the effects of said overload on said apparatus may disappear.

12. An electrical switching device comprising switching means adapted to control an electric circuit through current consuming apparatus, means to progressively change the position of said switch, overload responsive means for controlling said first named means so that said switch is in closed position during normal circuit conditions and open position during overload conditions, said overload responsive means including a thermostatic element adapted to maintain said switch in open position for a time interval within which the effects of said overload on said apparatus may disappear and means for locking said switch in open position after a series of operating cycles.

13. A protective switch comprising two toothed members disposed in parallel planes, one above the other, and rigidly connected to each other, means tending to rotate said members, a latch element adapted to engage the teeth on said toothed elements for controlling the movement thereof and electric switching means associated with said toothed element and operated thereby.

14. An electrical protective device comprising two superposed toothed elements disposed in parallel planes and rigidly connected, means tending to rotate said elements, a bimetallic member adapted to engage a tooth of said toothed elements and functioning as an escapement control therefor and switching means controlled by said toothed members.

15. An electrical switching device comprising a pair of superposed toothed members mounted in parallel planes rigidly connected to each other and rotatively staggered, means tending to rotate said elements, a switch controlled by said elements, an overload responsive means including a bimetallic latch adapted to engage either of said toothed elements and functioning as an escapement to control the position of said switch in accordance with circuit conditions.

16. An electrical switching device comprising a switching means adapted to open and close an electric circuit, a spring actuated escapement for controlling said switch, a thermostatic latch for controlling said escapement, means for locking said escapement after a predetermined series of operating cycles, means for winding said spring and unlocking said escapement and means for preventing the over-winding of said spring.

FRED H. OSBORNE.
HOWARD M. THRELKELD.